Oct. 1, 1963     H. L. McCOMBS, JR     3,105,354
FUEL CONTROL FOR COMBUSTION ENGINES
Filed Aug. 8, 1960     3 Sheets-Sheet 1
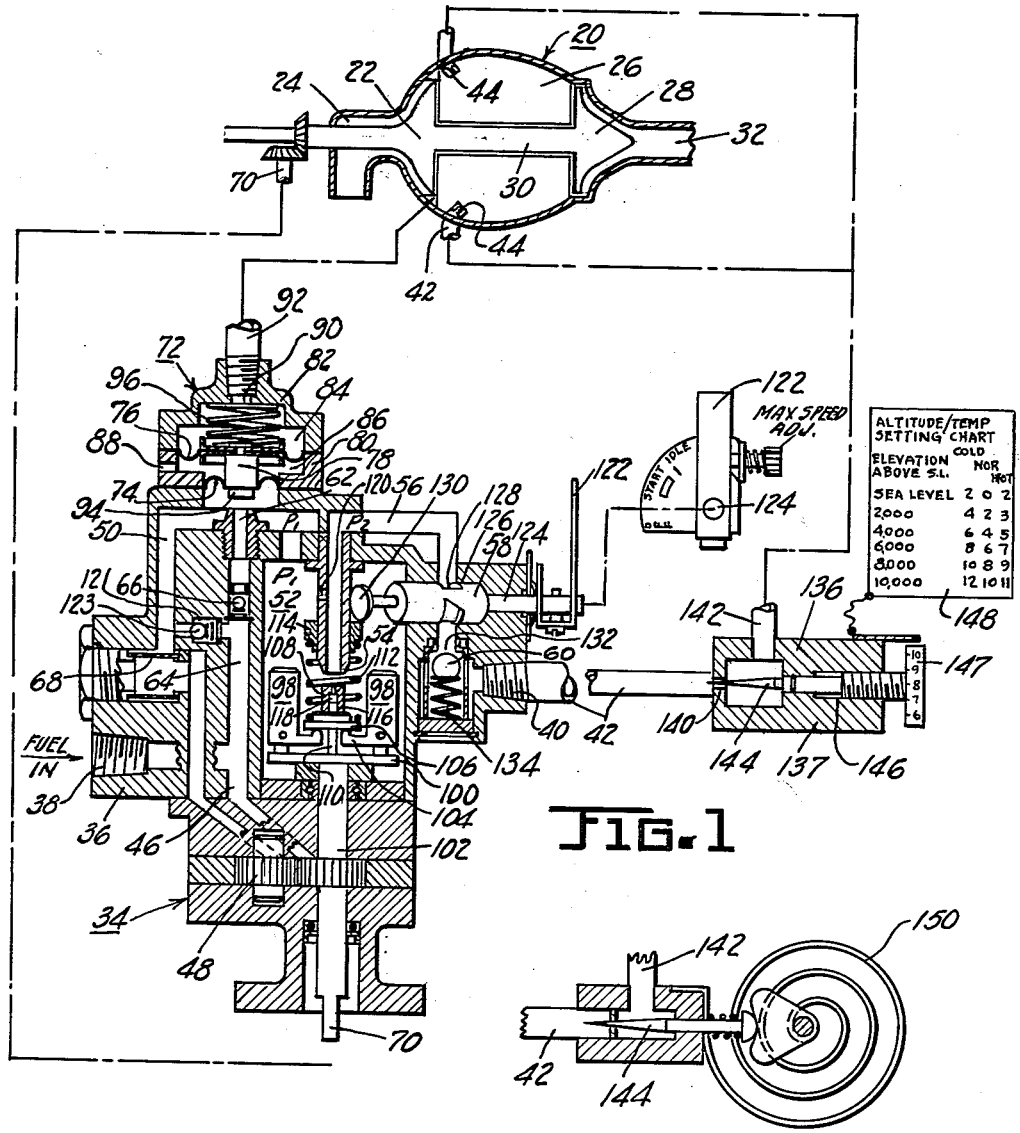
FIG. 1
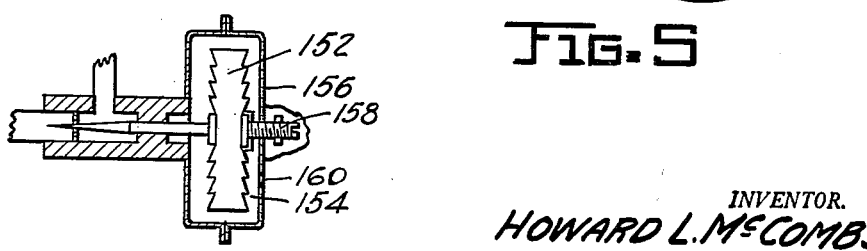
FIG. 5
FIG. 6
INVENTOR.
HOWARD L. McCOMBS, JR.
BY
Gordon H. Cheney
AGENT

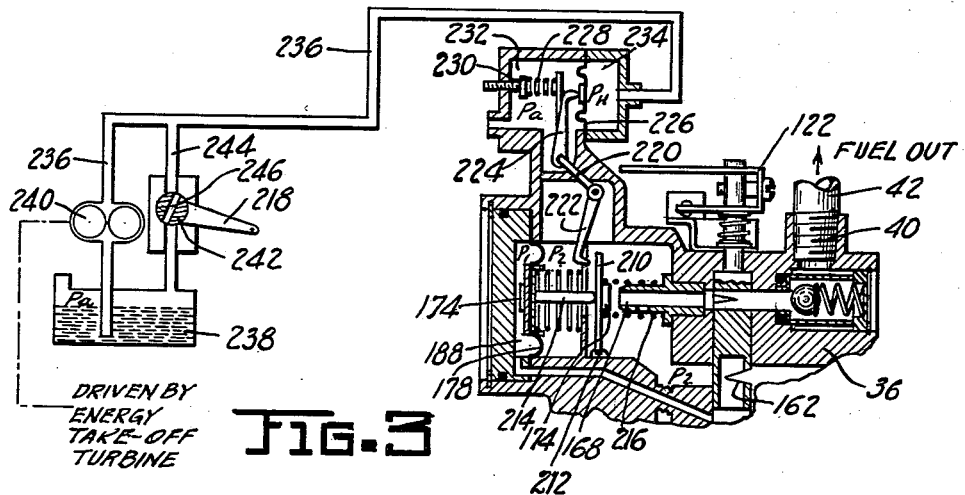
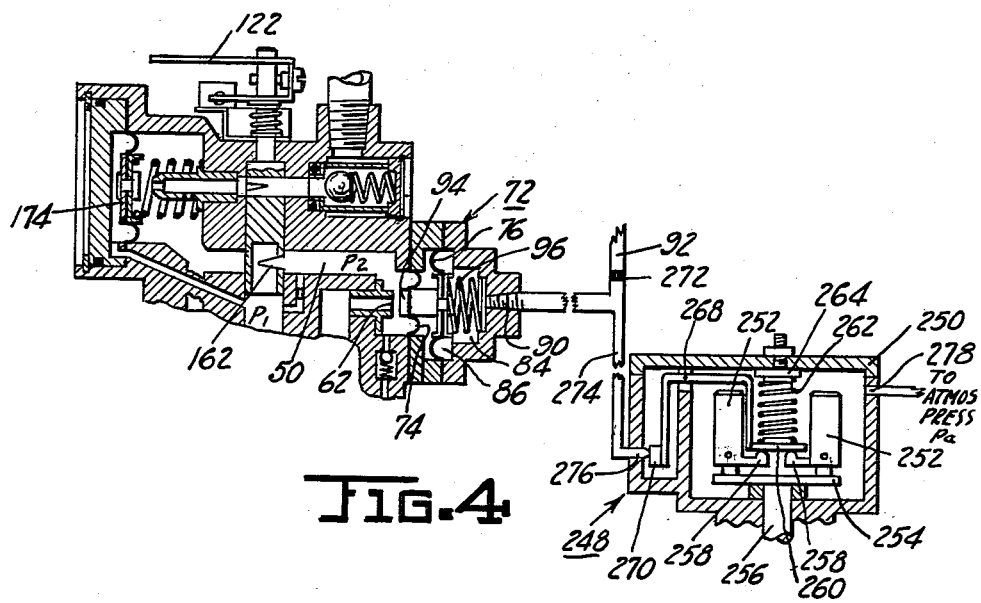

United States Patent Office 3,105,354
Patented Oct. 1, 1963

3,105,354
FUEL CONTROL FOR COMBUSTION ENGINES
Howard L. McCombs, Jr., South Bend, Ind., assignor to
The Bendix Corporation, a corporation of Delaware
Filed Aug. 8, 1960, Ser. No. 48,202
12 Claims. (Cl. 60—39.28)

This invention relates in general to fuel control apparatus for combustion engines and, in particular, to a fuel control for a gas turbine engine.

It is an object of this invention to provide a simple and effective fuel control mechanism for a combustion engine.

It is another object of this invention to provide a fuel control mechanism for a combustion engine which regulates fuel flow reliably and accurately without the use of a conventional fuel metering valve.

It is still another object of this invention to provide a fuel control for a gas turbine engine wherein a fuel pressure regulator responsive to the compressor discharge air pressure to which a fixed area fuel nozzle discharges and to the fuel pressure upstream from the fuel nozzle operates to regulate the fuel pressure upstream from the fuel nozzle to maintain a predetermined relationship between the pressures upstream and downstream from the fuel nozzle to thereby establish a predetermined acceleration fuel flow schedule to the engine.

An important object of this invention is to provide a fuel control for a gas turbine engine wherein the engine fuel nozzle is utilized as a fixed fuel metering area and the pressure differential thereacross is controlled by a fuel pressure regulator responsive to compressor discharge air pressure.

Another important object of this invention is to provide a fuel control for a gas turbine engine wherein the engine fuel nozzle is utilized as a fixed fuel flow metering area and the pressure differential thereacross is controlled simply and accurately by a fuel pressure regulator which regulates the fuel pressure upstream from the fuel nozzle directly in accordance with compressor discharge air pressure to which the fuel nozzle discharges.

The foregoing and other objects and advantages of this invention will become apparent in view of the following description taken in conjunction with the accompanying drawings wherein:

FIGURE 1 represents a sectional view of a gas turbine engine and a fuel supply system therefor embodying the present invention;

FIGURE 3 represents a second modified form of the present invention;

FIGURE 4 represents a third modified form of the present invention;

FIGURE 5 represents automatic temperature responsive mechanism which may replace the manual temperature control mechanism of FIGURE 2; and FIGURE 6 represents barometric pressure responsive mechanism which may replace hte manual temperature control mechanism of FIGURE 2.

FIGURE 1

Figure 2:
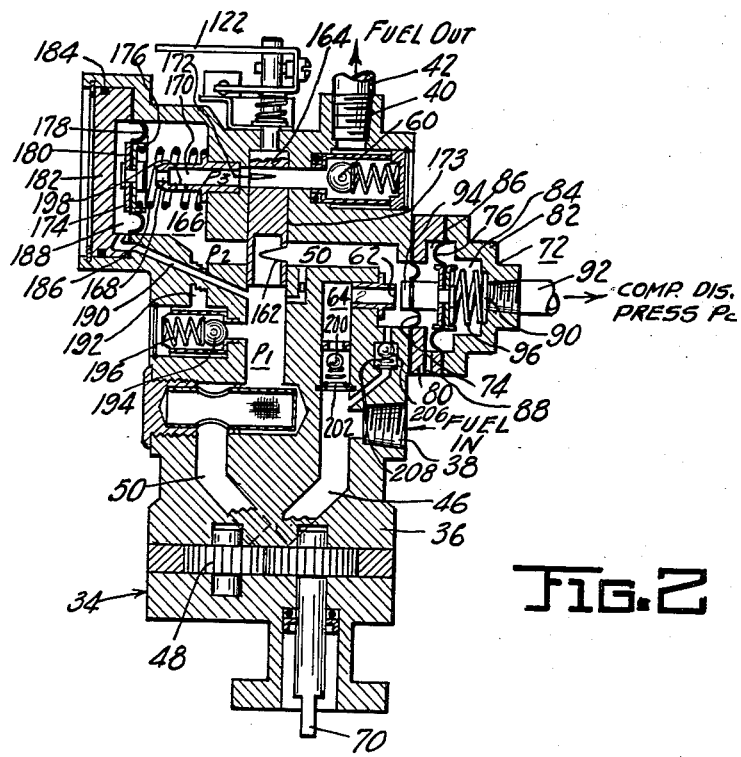
FIGURE 2 represents a modified form of the present invention.

Referring to FIGURE 1, numeral 20 represents a typical gas turbine engine having an air compressor 22 which receives air via an inlet duct 24 and discharges pressurized air to one or more combustion chambers 26. The mixture of fuel and air is ignited by conventional ignition apparatus, not shown, and the expanded air and products of combustion are directed through a turbine 28 drivably connected to the compressor 22 via a shaft 30. The heated motive air exhausts from the turbine 28 and may be expanded through an exhaust duct 32 to the atmosphere thereby extracting in the form of jet thrust the remaining unexpended energy of the exhaust air. The heated motive air exhausted from the turbine 28 may be utilized as a heat source in a steam generating plant or the like in which case the exhaust duct 32 would be modified accordingly to avoid the above mentioned jet thrust. Another arrangement whereby the remaining unexpended energy may be converted to a different form of useable power is to provide one or more energy take-off turbines, not shown, through which the exhaust air from the turbine 28 is directed prior to discharge through exhaust duct 32.

A fuel control generally indicated by numeral 34 is provided with a casing 36 having a fuel inlet port 38 which is supplied fuel from a suitable source, not shown, and an outlet port 40 which discharges fuel to combustion chambers 26 via conduit 42 and fuel nozzles 44, the latter being schematically shown as fuel restrictions.

The fuel inlet and outlet ports 38 and 40 communicate via a passage 46 leading to the inlet of an engine driven positive displacement fuel pump 48, a passage 50 leading from the outlet of the fuel pump 48, a chamber 52, an orifice 54, a passage 56 and a check valve 60. A fuel by-pass orifice 62 comunicates passage 50 with a by-pass passage 64 which leads to fuel pump inlet passage 46 and which contains a spring loaded check valve 66. A filter 68 arranged in passage 50 upstream from fuel by-pass passage 64 serves to filter the fuel discharged by the fuel pump 48. The fuel pump 48 is driven by the compressor 22 through a conventional shafting and gearing arrangement generally indicated by numeral 70 and delivers fuel at a rate which varies as a function of the speed of the compressor.

A fuel pressure regulator 72 operates to control the effective flow area of by-pass orifice 62 and thus the pressure head across the orifice 54, the check valve 60 and the engine fuel nozzles 44. The regulator 72 includes spaced apart differential area flexible diaphragms 74 and 76 which are fixedly secured at their center portions to opposite ends of a rod 78. The outer edge of diaphragm 74 is clamped between casing 36 and an annular spacing member 80. The outer edge of diaphragm 76 is clamped betwen spacing member 80 and a cap 82. The diaphragms 74 and 76, spacing member 80 and cap 82 together define two chambers 84 and 86, which communicate with atmospheric or ambient pressure $P_a$ via port 88 in spacing member 80 and compressor discharge pressure $P_c$ via a port 90 in cap 82 and a passage 92, respectively. A valve member 94 formed on the end of rod 78 cooperates with by-pass orifice 62 to vary the by-pass fuel flow therethrough and thus the fuel pressure $P_1$ in passage 50 and chamber 52. The valve 94 is urged toward by-pass orifice 62 by the force of a spring 96 interposed between diaphragm 76 and cap 82 which spring force is opposed by the force differential resulting from the $P_1-P_a$ pressure differential acting across the effective area of diaphragm 74 minus the $P_c-P_a$ pressure differential acting across the effective area of the larger diaphragm 76.

The effective flow area of orifice 54 and thus fuel flow to the engine is made to vary as a function of compressor speed by a pair of governor fly-weights 98 pivotally mounted on a support 100 which is rotated in accordance with compressor speed by a shaft 102 fixedly secured to the speed input shaft via fuel pump 48. The governor fly-weights 98 generate a force which varies as a function of compressor speed squared and through arms 104 applies this force to a flanged portion 106 of an annular member 108 slidably carried on a stem 110 fixedly secured to the support 100. The annular member 108 is movable toward and away from orifice 54 depending upon the output force of governor fly-weights 98 and the opposing force of a governor speed setting spring 112 interposed between the flanged portion 106 and a tubular member 114 slidably carried on casing 36. The effective flow area of orifice 54 is controlled by the upper surface of annular member 108. A central opening 116 communicates fuel pressure $P_2$ in passage 56 with a bore 118 formed in annular member 108 in which the stem 110 slides to thereby effect a pressure balance across the annular member 108.

A minimum fuel flow to the engine is provided by an orifice 120 in parallel with the orifice 54 such that, during an engine deceleration when orifice 54 is closed, a predetermined quantity of fuel is allowed to by-pass orifice 54 to thereby maintain continuous combustion in the chambers 26.

A passage 121 provided with a spring loaded relief valve 123 communicates passage 50 with by-pass passage 64.

The valve member 58 is fixedly secured to a throttle lever 122 via a rod 124 and is rotatably positioned in a bore 126 as a function of the position of the throttle lever. The valve member 58 serves as a fuel cut-off valve and is provided with a port 128 which is contoured to provide a progressively increasing effective flow area as the throttle lever 122 is moved from cut-off position to idle position to thereby effect a predetermined fuel flow schedule for engine starting purposes. Between idle and maximum speed positions of the throttle lever the effective flow area of port 128 is constant irrespective of throttle lever position. A cam 130 formed on the end of valve member 58 bears against tubular member 114 and operates to bias tubular member 114 downwardly thereby establishing a governor spring 112 force which increases in accordance with increasing speed settings of the throttle lever 122. The cam 130 is contoured to maintain a fixed setting of the tubular member 114 and thus governor spring 112 between cut-off and idle positions of the throttle lever 122.

The check valve 60 is loaded in a closing direction against orifice 132 by a spring 134.

The fuel flow requirements of a gas turbine engine vary in accordance with changes in atmospheric temperature and pressure and/or variable conditions of engine operation such as turbine inlet temperature or pressure or the like and it is the usual practice to compensate for these variable conditions by adjusting fuel flow accordingly. To this end, an adjustable valve structure 136 is arranged in series flow relationship with conduit 42. The valve structure 136 includes a casing 137 provided with an inlet orifice 140 and an outlet port 142, a tapered valve member 144 threadedly engaged in an opening 146 in casing 137 and suitably engaged with orifice 140, and a dial indicator 147 fixedly secured to the valve member 144 for adjusting the same. The dial indicator is calibrated in accordance with the altitude number relationship shown on a tag 148 suitably attached to the valve structure 136. The dial indicator is manually adjusted to the setting corresponding to a given altitude to thereby establish an equivalent setting of valve member 144 which, in turn, results in a constant percent change in the fuel flow through conduit 42 to the engine.

The manually operated valve structure 136 may be replaced by automatic temperature and/or pressure responsive means as desired to effect an automatic altitude correction of fuel flow. FIGURE 5 illustrates a conventional temperature responsive element 150 connected to actuate the tapered valve member 144. FIGURE 6 illustrates an evacuated capsule 152 disposed in a chamber 154 formed by casing 36 and a cap 156 suitably secured thereto by fastenings 158. The chamber is vented to the atmosphere through opening 160 in cap 156. The capsule 152 is anchored in position by an adjustable stem 158 secured to one side of capsule 152 and threadedly engaged in an opening in cap 156. The tapered valve member 144 is fixedly secured to the movable end and is positioned in orifice 140 in response to expansion and contraction of capsule 152 in accordance with pressure variations in chamber 154.

Operation of FIGURE 1

Assuming engine operation to be stable at a speed corresponding to a selected throttle lever position, the various elements will occupy the positions shown in FIGURE 1 and the rate of fuel flow to the engine will be a function of the effective flow area of the orifice 54 and fuel nozzles 44 as established by the setting of governor spring 112 and the opposing equal force generated by governor fly-weights 98, and the pressure differential $P_1-P_c$ established across orifice 54 and fuel nozzles 44 by the valve 94 in response to the compressor pressure rise $P_c-P_a$.

Now, assuming the throttle lever 122 to be rotated to a maximum speed position, the valve member 58 will be rotated accordingly whereupon cam 130 urges tubular member 114 downwardly against the governor spring 112 which, in turn, loads annular member 108 and governor fly-weights 98 thereby opening orifice 54 to a maximum flow area. With orifice 54 at a maximum flow area, the flow of fuel to the combustion chambers 26 is primarily a function of the effective flow area of fuel nozzles 44 and the fuel pressure drop $P_3-P_c$ thereacross. Since check valve 60 and valve structure 136 restrict fuel flow to a relatively small extent, the fuel pressure $P_3$ may be considered substantially equal to fuel pressure $P_1$ such that the pressure drop across the fuel nozzles 44 is substantially $P_1-P_c$. As the engine accelerates in response to the increase in fuel flow through orifice 54, compressor discharge pressure $P_c$ and the speed of fuel pump 48 increase accordingly. The fuel pressure $P_1$ acts against diaphragm 74 producing a force which acts to bias valve 94 away from orifice 62 in opposition to the force derived from compressor discharge pressure $P_c$ acting against diaphragm 76. Atmosphere air pressure $P_a$ which is equivalent to the pressure at the inlet of the compressor 22 is supplied to chamber 80 which, by virtue of the area differential associated with diaphragms 74 and 76, produces a force which opposes the force derived from pressure $P_c$. The spring 96 serves to preload the diaphragms 74 and 76 and in the absence of a pressure differential $P_1-P_c$ serves to load valve 94 in a closing direction. As the engine accelerates, causing compressor discharge pressure $P_c$ to increase, the effective flow area of orifice 62 and thus by-pass fuel flow through passage 64 is progressively adjusted by the valve member 94 to thereby regulate fuel pressure $P_1$ as a function of the compressor pressure rise $P_c-P_a$. Since the fuel nozzles 44 have a constant flow area, the fuel flow therethrough is caused to vary as a function of the pressure differential $P_1-P_c$ thereacross. Thus, a predetermined fuel flow which varies as a function of compressor pressure rise $P_c-P_a$ is maintained during engine acceleration.

As the compressor approaches the speed selected by the throttle lever 122, the governor spring 112 is overcome by the force of governor fly-weights 98 and the annular member 108 is biased accordingly toward orifice 54. The subsequent decrease in flow area of orifice 54 and reduction in fuel flow therethrough produces a drop in the pressure differential $P_3-P_c$ across fuel nozzles 44 which, in turn, effects a reduction in fuel flow and subsequent conventional governor break action. Upon reaching the selected speed, the force of governor fly-weights 98 balance the force of governor spring 112 and the annual member 108 is stabilized thereby establishing the required flow area of orifice 54. The fuel flow to the combustion chamber 26 is controlled at the selected speed in accordance with the effective flow area of orifice 54 and fuel nozzles 44 and the fuel pressure differential $P_1-P_c$ thereacross. The pressure differential $P_1-P_c$ is maintained relatively constant by the pressure regulator 72 in accordance with the compressor pressure rise $P_c-P_a$ existing at the selected speed. The check valve 66 in passage 64 serves to maintain a lower limit on the fuel pressure $P_1$ during engine acceleration when the valve 94 is actuated in an opening direction thereby permitting greater by-pass flow through orifice 62. An upper limit is placed upon fuel pressure $P_1$ by check valve 123 which opens at a predetermined fuel pressure to divert fuel from passage 50 to by-pass passage 64.

During starting operation of the engine the compressor pressure rise $P_c-P_a$ is substantially zero and the orifice 62 is closed by valve member 94 in response to spring 96. Also, the orifice 54 is fully open by virtue of the force established by governor spring 112 in accordance with the start position of the throttle lever 122. The port 128 in valve member 58 is shown V-shaped and the effective flow area thereof increases from a minimum area at throttle lever cut-off position to a maximum area at throttle lever idle position which arrangement provides a progressive increase in fuel flow as the throttle lever 122 is advanced from start position to idle position. Of course, at throttle lever cut-off position the port 128 is closed to prevent fuel flow to the combustion chamber 26.

During an engine deceleration, fuel flow is controlled by orifice 120 which allows fuel to by-pass the closed orifice 54 in sufficient quantity to avoid combustion chamber flame out.

FIGURE 2

FIGURE 2 illustrates a modified form of the fuel control shown in FIGURE 1 wherein the speed input to the governor section is derived from fuel pressure rather than a set of mechanical governor fly-weights. The elements of FIGURE 2 which correspond to like elements of FIGURE 1 are numbered accordingly.

The fuel inlet and outlet ports 38 and 40 communicate via the passage 46 leading to the inlet of the engine driven positive displacement fuel pump 48, the passage 50 leading from the outlet of the fuel pump 48, a port 162 formed in a valve member 164, a chamber 166, an orifice 168, a passage 170, a port 172 in valve member 164 and the spring loaded check valve 60. The fuel pressure regulator 72 controls the flow of fuel through by-pass orifice 62 in the manner set forth in FIGURE 1.

The valve member 164 is slidably carried in a bore 173 in casing 36 and is rotatably actuated as a function of the position of the throttle lever 122. The valve port 172 serves to cut-off fuel flow to the engine when the throttle lever 122 is in an off position and is contoured to provide a gradually increasing effective flow area between start and idle positions of the throttle lever. The effective flow area of port 172 is constant between idle and maximum speed positions of the throttle lever 122.

The effective flow area of orifice 168 is controlled by governor mechanism comprising a valve member 174 suitably fixedly secured to a spring retainer 176 which, in turn, is fixedly secured to a diaphragm 178 clamped between the spring retainer 176 and a back up washer 180. The outer edge of the diaphragm 178 is clamped between casing 36 and a cap 182 secured to casing 36 by any suitable means such as the snap ring 184. The diaphragm 178 is loaded by a spring 186 interposed between casing 36 and spring retainer 176 in opposition the fuel pressure differential between chamber 166 and a chamber 188 on opposite sides of diaphragm 178. A passage 190 communicates chamber 188 with passage 50 upstream from port 162. A passage 192 communicates passage 50 with chamber 166. Fuel flow through passage 192 is controlled by a check valve 194 which is loaded by a spring 196 and which opens at a predetermined fuel pressure to thereby vent fuel pressure $P_1$ to chamber 166 and prevent the pressure differential $P_1-P_2$ from exceeding a predetermined maximum value. In this manner, the diaphragm 178 is not overstressed by an excessive pressure differential $P_1-P_2$ thereacross when valve member 164 is moved towards a closed position as during a deceleration of the engine.

The port 162 in valve member 164 is in series with the total discharge of the fuel pump 48 which discharge, by virtue of the type of fuel pump shown, varies in direct proportion to the fuel pump speed and thus compressor speed. For a given flow area of port 162 the pressure drop $P_1-P_2$ thereacross varies as the square of compressor speed and it will be understood that a certain compressor speed is required to develop a certain pressure drop across the given flow area of port 162. If the flow area of port 162 is decreased, a lower compressor speed will be required to develop the given pressure drop. Therefore, in order to maintain a constant pressure differential $P_1-P_2$ across port 162 with varying compressor speed the flow area of port 162 must be increased in direct proportion to increasing compressor speed. To this end, the port 162 is provided with a gradually increasing effective flow area as shown such that, as the throttle lever 122 is advanced and valve member 164 rotated accordingly, the port 162 presents a progressively increasing opening which, in turn, establishes a greater flow of fuel to the engine.

An orifice 198 in parallel flow relationship with 168 maintains a predetermined flow of fuel to the combustion chambers 26 during deceleration of the engine to thereby avoid combustion chamber flameout.

A minimum flow check valve 200 loaded by spring 202 disposed in bypass passage 64 provides for a minimum acceleration fuel flow as will be described hereinafter. A passage 204 connected between passages 46 and 50 contains a ball valve 206 loaded by a spring 208. The ball valve 206 opens in response to a predetermined maximum fuel pressure $P_2$ to thereby vent fuel to passage 46 at pressure $P_0$ and limit acceleration fuel flow to a predetermined maximum value.

Operation of FIGURE 2

Assuming engine operation to be stable at a selected speed, the various elements of the fuel control 34 will occupy the positions shown in FIGURE 2. Fuel flow to the engine is controlled as a function of throttle lever position as established by the effective flow area of port 162, as a function of speed by the effective flow area of orifice 168 as established by the valve 174 and the governor diaphragm 178 in response to the predetermined pressure differential $P_1-P_2$ across port 162, and as a function of the compressor pressure rise $P_c-P_a$ across the compressor by the regulator valve 94 and diaphragm 76 in response to the pressure differential $P_c-P_a$ between chambers 80 and 86.

Now, assuming the throttle lever 122 to be actuated to a maximum speed position, the following sequence of operaiton will occur. In accordance with the speed request, the valve member 164 will be rotated to a position which establishes a maximum effective flow area of port 162 and a subsequent decrease in fuel pressure $P_1$. The decrease in fuel pressure $P_1$ results in a lower fuel pressure differential $P_1-P_2$ across port 162 which, in turn, unbalances the governor diaphragm 178 toward chamber 188 causing the valve member 174 to move away from orifice 168 thereby establishing a maximum effective flow area of the same. The resulting increase in fuel flow through the orifice 168 to the combustion chambers 26 initiates an acceleration of the engine which, in turn, produces an increase in compressor discharge pressure $P_c$ and an increase in the speed of fuel pump 48. Since the total discharge of the fuel pump 48 is directed through the port 162 and the orifice 168 is at a maximum area, it will be understood that fuel flow must be limited as a function of a suitable engine operating condition if the engine is not to be over-fueled during an acceleration thereof. To this end, the fuel pressure regulator 72 controls the fuel pressure $P_2$ as a function of compressor discharge pressure $P_c$ during engine acceleration. The diaphragm 76 which responds to the compressor pressure rise $P_c-P_a$ is actuated by the increasing compressor discharge pressure $P_c$ in opposition to the fuel pressure $P_2$ acting against diaphragm 94 and the valve member 94 is positioned accordingly to cause an increase in the effective flow area of by-pass orifice 62, which in turn, permits fuel at pressure $P_2$ to escape through by-pass passage 64 thereby reducing fuel flow through governor orifice 168 accordingly. It will be noted that the fuel nozzles 44 are in series with the orifice 168 such that, with the orifice 168 at a maximum flow area during an engine acceleration, the flow area of the fuel nozzles acts as the effective metering area through which fuel is forced. Since the fuel upstream from the fuel nozzles is substantially at pressure $P_2$, it will be recognized that the $P_1-P_c$ pressure drop across the fuel nozzles is controlled as a function of the compressor pressure rise $P_c-P_a$ during accelerations by the action of the pressure regulator 72. A minimum acceleration fuel flow is maintained during acceleration by the check valve 200 which sets a lower limit on pressure $P_2$ when the orifice 62 is substantially unrestricted. As the compressor approaches the selected speed, the fuel pressure differential $P_1-P_2$ across the port 162 approaches the predetermined value heretofore mentioned whereupon the governor diaphragm 178 and valve 174 move toward orifice 168 thereby causing a decrease in the effective flow area of orifice 168 and a corresponding decrease in fuel flow to the engine which action is similar to the conventional "governor break" produced by the governor fly-weights 98 of FIGURE 1. At the selected compressor speed, the predetermined fuel pressure pressure differential $P_1-P_2$ across port 162 is reached whereupon the governor diaphragm 178 is stabilized and the fuel flow to the engine governed accordingly to maintain the selected compressor speed. The pressure regulator 72 then maintains the fuel pressure differential $P_2-P_c$ at a constant value in accordance with the pressure differential $P_c-P_a$ applied thereto.

The orifice 168 is closed by valve 174 in response to the pressure differential $P_1-P_2$ across governor diaphragm 178 during an engine deceleration. The orifice 198 which is in parallel flow relationship with orifice 168 operates to supply a predetermined continuous flow of fuel to the combustion chambers 26 to thereby maintain the combustion process during engine deceleration to a lower speed.

The manually operated valve structure 136 or automatic temperature and pressure responsive means of FIGURES 1, 5 and 6 may be combined with the fuel control of FIGURE 2 to effect fuel flow correction in accordance with altitude variations.

*FIGURE 3*

FIGURE 3 illustrates in partial section the fuel control shown in FIGURE 2 modified by the addition of a second governor mechanism for controlling the speed of an energy take-off turbine, not shown, having a fluid coupling with the compressor turbine 28 and being independently rotated relative thereto by the exhaust gases from the same. The elements of FIGURE 3 which correspond to like elements of FIGURE 2 are numbered accordingly.

The orifice 168 is controlled by the valve member 174 which in the embodiment shown in FIGURE 3 is fixedly secured to a lever 210. The lever 210 is pivotally secured to a support 212 formed on casing 36 and is actuated by a rod 214 fixedly secured to the center portion of diaphragm 178 in accordance with the fuel pressure differential $P_1-P_2$ acting across the diaphragm as heretofore explained in regard to FIGURE 2. The lever 210 is lightly loaded against the rod 214 by a spring 216 interposed between lever 210 and casing 36. The lever 210 is further actuated as a function of the position of a throttle lever 218 and the speed of the energy take-off turbine, not shown. To this end, a rod 220 rotatably secured in casing 36 is provided with a lever 222 fixedly secured to one end thereof which bears against the lever 210 and a lever 224 fixedly secured to the opposite end thereof which bears against a diaphragm 226. The lever 224 is preloaded against diaphragm 226 by a spring 228 interposed between lever 224 and an adjustable spring retainer 230 threadedly engaged with casing 36. The diaphragm 226 is exposed to atmospheric air pressure $P_a$ in a chamber 232 on one side of the diaphragm and a control hydraulic pressure $P_H$ in a chamber 234 on the opposite side of the diaphragm. A passage 236 communicates chamber 234 with a suitable source of fluid such as oil tank 238 and contains a positive displacement fluid pump 240 similar to fuel pump 48. The fluid pump 240 is driven by the energy take-off turbine, not shown, through conventional shafts and gears, not shown, and delivers oil from tank 238 at a rate proportional to the speed of the energy take-off turbine. The control fluid pressure in passage 236 and thus chamber 234 is varied as a function of the position of throttle lever 218 by a valve member 242 suitably arranged in a passage 244 connected between tank 238 and passage 236 downstream from the pump 240. A port 246 in valve member 242 is in series flow relationship with the output flow of pump 240. It will be noted that for a given flow area of port 246, like port 162 in valve member 164, the pressure differential $P_H-P_a$ thereacross will vary as the square of the speed of the pump 240 and thus the speed of the energy take-off turbine. A certain energy take-off turbine speed is required to develop a certain pressure drop across the given flow area of port 246. Larger and smaller flow areas of port 246 will require higher and lower pump 240 speeds, respectively, to maintain a constant pressure differential across port 246. Thus, as throttle lever 218 is moved in an increasing speed direction, the flow area of port 246 is increased accordingly which, in turn, requires a corresponding higher pump 240 speed to generate the required constant pressure differential $P_H-P_a$.

*Operation of FIGURE 3*

It will be understood that the throttle levers 122 and 218 are independently operable and produce speed request signals which are mutually overriding, i.e., the speed setting which requires the least amount of fuel to maintain the selected speed is predominant and the other speed request is overridden accordingly. For instance, assuming that the throttle levers 122 and 218 to be in their maximum speed positions, the valve member 174 will occupy a position in accordance with the force developed by the aforementioned predetermined pressure differential $P_1-P_2$ acting across diaphragm 178 which acts through rod 214 and lever 210 against valve member 174. In this manner, the effective flow area of orifice 168 is regulated to maintain the proper flow of fuel to the combustion chambers 26 in accordance with the selected maximum speed of compressor 22. The lever 222 lightly bears against lever 210 in response to the pressure differential $P_H-P_a$ acting across diaphragm 226 such that the position of the valve member 174 also corresponds to the selected maximum speed of the energy take-off turbine. Now, with the compressor 22 operating at a stable maximum speed, it will be assumed that the throttle lever 218 is actuated to a position which corresponds to a lower energy take-off turbine speed. The valve member 242 is rotated accordingly and the effective flow area of port 246 decreased which, in turn, causes a rise in the pressure differential $P_H-P_a$ across diaphragm 226. The levers 222 and 224 are subsequently loaded in a counterclockwise direction by the diaphragm 226 with lever 222 urging lever 210 in a clockwise direction away from rod 214 thus overriding the action of diaphragm 178. The valve member 174, in turn, is biased toward orifice 168 and the decrease in effective flow area thereof produces a decrease in fuel flow to the combustion chambers 26 which, in turn, causes a decrease in the speed of the compressor and the energy take-off turbine. As the speed of the energy take-off turbine decreases, the speed of the pump 240 decreases causing a drop in pressure differential $P_H-P_a$ across port 246 and diaphragm 226 whereupon the required predetermined pressure differential $P_H-P_a$ is reestablished and diaphragm 226 stabilized accordingly which results in stabilization of valve member 174. The fuel flow to the combustion chambers 26 is regulated accordingly and the energy take-off turbine governed at the selected speed while the compressor speed stabilizes at some intermediate speed in response to the decrease in fuel flow. As long as the throttle lever 122 is maintained in the maximum speed position, the throttle lever 218 is operative to govern energy take-off turbine speed to any selected speed within the speed range of the same. However, the throttle lever 122 may be set for some intermediate compressor speed and the speed of the energy take-off turbine will be limited accordingly irrespective of any position of the throttle lever 218 which requests a higher energy take-off turbine speed. In such a case, it will be noted that the lever 210 is loaded by the diaphragm 178 in accordance with the pressure differential $P_1-P_2$ thereacross and the speed of the compressor and energy take-off turbine will be limited in accordance with the speed selected by throttle lever 122. A throttle lever 218 request for a speed higher than can be obtained by the quantity of fuel flow corresponding to the throttle lever 122 request results in the diaphragm 226 loading levers 222 and 224 in a clockwise direction such that the lever 222 becomes disengaged from lever 210 thereby rendering the throttle lever 218 request ineffective. It will be readily understood by those persons skilled in the art that the settings of the throttle levers 122 and 218 may be adjusted to obtain various speed and power combinations of the compressor and energy take-off turbine depending upon the particular application of the engine.

FIGURE 4

FIGURE 4 illustrates in partial section the fuel control of FIGURE 2 modified by the addition of a maximum speed governor 248 which is responsive to the speed of an energy take-off turbine, not shown. The elements of FIGURE 4 which correspond to like elements of FIGURE 2 are numbered accordingly.

A casing 250 contains a set of governor fly-weights 252 pivotally mounted on a support 254 which is rotated in accordance with the speed of the energy take-off turbine, not shown, by a shaft 256. The fly-weights 252 generate a force which varies as a function of the speed of the energy take-off turbine and applies this force through arms 258 to an annular member 260 in opposition to the force of spring 262 interposed between annular member 260 and an adjustable spring retaining member 264 threadedly engaged with casing 250. A U-shaped lever pivotally secured to casing 250 by a pin 268 is engaged at one end with the annular member 260 and at the opposite end carries a flapper valve 270 fixedly secured thereto. The interior of casing 250 is vented to passage 92 downstream from a restriction 272 secured therein via a passage 274 and port 276 in casing 250 and to atmospheric air pressure $P_a$ via a port 278 formed in casing 250. The flapper valve 270 cooperates with port 278 and is normally biased by the spring loaded lever 266 into engagement with port 278 to thereby prevent the escape of compressor discharge air pressure $P_c$ from passage 92. As long as the port 278 is closed by flapper valve 270, actual compressor discharge air pressure $P_c$ will be supplied to chamber 86 via passage 92 and the diaphragm 76 actuated as a function of compressor pressure rise $P_c-P_a$ as mentioned heretofore in regard to FIGURE 1. However, when the energy take-off turbine attains a predetermined maximum allowable speed the force of governor fly-weights 252 will overcome the force of spring 262 causing the annular member 260 to move upward against the spring 262 and the U-shaped lever 266 to pivot counterclockwise about pin 268 whereupon the flapper valve 270 opens to allow compressor discharge air pressure $P_c$ to escape through port 276 to atmospheric air $P_a$. The subsequent drop in pressure $P_c$ in chamber 86 reduces the pressure differential $P_c-P_a$ across diaphragm 76 which, in turn, causes valve member 94 to move away from orifice 62 thereby increasing the by-pass fuel flow through orifice 62 and decreasing the fuel flow to the combustion chambers accordingly to limit the speed of the energy take-off turbine.

It will be understood that various changes and modifications in the structure shown and described may be made by those persons skilled in the art without departing from the spirit of the invention. While all access openings and fluid seals are not shown and described in the various embodiments of the present invention, it is believed to be well within the skill of the art to provide conventional access openings and fluid seals where required.

I claim:

1. Fuel control apparatus for a combustion engine having a combustion chamber, a fuel nozzle for injecting fuel into said combustion chamber and a throttle lever for controlling the operation of the engine, the combination of a fuel conduit connected to supply pressurized fuel to the fuel nozzle, governor valve means including a valve in said fuel conduit in series with said fuel nozzle and responsive to throttle lever position and engine speed for controlling fuel flow to maintain a selected engine speed, means responsive to compressor discharge air pressure, valve means operatively connected to said fuel conduit and responsive to the pressure therein and said air pressure responsive means for controlling the fuel pressure upstream from said governor valve, and a valve member responsive to at least one variable condition of engine operation to be controlled operatively connected to said fuel conduit between said governor valve and said fuel nozzle for modifying the effective flow area of said fuel conduit as a function of said variable condition said fuel flow through said fuel conduit being controlled by said valve means and said valve member, respectively, as a function of compressor discharge air pressure and said variable condition of operation at all times during operation of the engine.

2. Fuel control apparatus as claimed in claim 1 wherein said variable condition is compressor inlet air temperature.

3. Fuel control apparatus as claimed in claim 1 wherein said variable condition is compressor inlet air pressure.

4. Fuel control apparatus as claimed in claim 1 wherein one variable condition is compressor inlet air temperature and another variable condition is compressor inlet air pressure.

5. Fuel control apparatus as claimed in claim 1 wherein said governor valve is a variable area valve actuated as a function of throttle lever position and engine speed, said variable area valve and said valve member being in series flow relationship and together constituting an effective fuel metering area which is a function of throttle lever position, engine speed and said variable condition of engine operation.

6. Fuel control apparatus as claimed in claim 1 wherein said governor valve is actuated to a maximum open position during an acceleration of the engine whereupon the effective flow area of said fuel conduit is controlled by said valve member as a function of said variable condition of engine operation.

7. Fuel control apparatus as claimed in claim 1 and further including an engine driven positive displacement fuel pump connected to supply pressurized fuel to said fuel conduit at a rate proportional to engine speed, variable area valve means operatively connected to and actuated as a function of the position of said throttle lever and arranged in series with the output of said pump, means responsive to a predetermined constant fuel pressure differential across said variable area valve means operatively connected to said governor valve for controlling the operation of the same, said governor valve being operative in response to a variation from said predetermined constant fuel pressure differential to modify the fuel pressure of the fuel flowing through said fuel conduit and cause an increase or decrease in engine speed depending upon the relative change in said predetermined constant pressure differential whereupon said fuel pump speed and thus fuel pump discharge rate is caused to vary accordingly as a function of engine speed to thereby re-establish said predetermined constant fuel pressure differential across said variable area valve means.

8. Fuel control apparatus as claimed in claim 1 and further including an engine driven positive displacement fuel pump connected to supply pressurized fuel to said fuel conduit at a rate proportional to engine speed; variable area valve means operatively connected to said throttle lever and to said fuel conduit in series with said fuel pump for controlling the effective flow area of said fuel conduit as a function of the position of said throttle lever, means responsive to a predetermined constant fuel pressure differential across said variable area valve means operatively connected to said governor valve for modifying the effective flow area of said fuel conduit in response to variations from said predetermined constant fuel pressure differential, said variable area valve means being operative to establish a different effective flow area for each position of said throttle lever such that the speed of the engine and thus the discharge rate of the fuel pump is caused to vary accordingly, said predetermined constant fuel pressure differential being attained at an engine speed corresponding to the position of said throttle lever.

9. Fuel control apparatus as claimed in claim 1 wherein the combustion engine is a gas turbine engine having first and second independently rotatable gas gas turbines, said throttle lever being connected to control the operation of one of the first and second gas turbines, said fuel control apparatus further including valve means responsive to the speed of the other of the first and second gas turbines for venting the compressor discharge air pressure to which said means responds to a low pressure source to thereby effect a reduction in fuel flow to the combustion chamber in response to a predetermined maximum allowable speed of the other gas turbine.

10. Fuel control apparatus as claimed in claim 1 wherein the combustion engine is a gas turbine engine having a rotatable gas turbine responsive to the products of combustion and connected to drive the compressor, said throttle lever being operative to control the operation of the rotatable gas turbine, means responsive to the exhaust gases from the gas turbine for converting the energy therein to a useful power output, and positionable means operative between minimum and maximum power output positions for controlling the operation of said last named means, said fuel control apparatus further including control means operatively connected to said compressor discharge air pressure responsive means for modifying the compressor discharge air pressure supplied thereto in accordance with a selected maximum power output of the exhaust gas responsive means, said control means including a normally closed valve member operative to vent the compressor discharge air pressure to which said means responds to a low pressure source, resilient means for holding said normally closed valve member in its closed position, and means responsive to an operating condition indicative of the power output of the exhaust gas responsive means operatively connected to said resilient means for overcoming the same in response to said selected maximum power output to thereby actuate said normally closed valve member to an open position and limit the air pressure supplied to said compressor discharge pressure responsive means to a maximum value.

11. Fuel control apparatus as claimed in claim 1 wherein said valve means is a fuel bypass valve connected to said fuel conduit upstream of said governor valve means and a source of fuel at relatively low pressure.

12. Fuel control apparatus as claimed in claim 11 and further including a fuel pressure responsive spring loaded valve connected in series flow relationship with and downstream from said fuel bypass valve for establishing a minimum pressure limit on the fuel flowing from said fuel bypass valve to said source.

References Cited in the file of this patent
UNITED STATES PATENTS

| | | |
|---|---|---|
| 2,508,260 | Holley | May 16, 1950 |
| 2,674,847 | Davies | Apr. 13, 1954 |
| 2,836,957 | Fox | June 3, 1958 |
| 2,846,846 | Mock | Aug. 12, 1958 |
| 2,939,280 | Farkas | June 7, 1960 |
| 2,959,002 | Best | Nov. 8, 1960 |
| 2,968,151 | Abraham | Jan. 17, 1961 |
| 3,006,143 | Cowles | Oct. 31, 1961 |
| 3,023,575 | Haase | Mar. 6, 1962 |

FOREIGN PATENTS

| | | |
|---|---|---|
| 646,780 | Great Britain | Nov. 29, 1950 |